United States Patent
Hayasaka et al.

(10) Patent No.: US 9,620,009 B2
(45) Date of Patent: Apr. 11, 2017

(54) VEHICLE SURROUNDINGS MONITORING DEVICE

(71) Applicant: TOYOTA JIDOSHA KABUSHIKI KAISHA, Toyota-shi, Aichi (JP)

(72) Inventors: Shoichi Hayasaka, Atsugi (JP); Yuichi Kumai, Gotenba (JP); Shinichi Nagata, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/103,943

(22) PCT Filed: Dec. 25, 2014

(86) PCT No.: PCT/JP2014/084748
§ 371 (c)(1),
(2) Date: Jun. 13, 2016

(87) PCT Pub. No.: WO2015/111367
PCT Pub. Date: Jul. 30, 2015

(65) Prior Publication Data
US 2016/0321920 A1    Nov. 3, 2016

(30) Foreign Application Priority Data

Jan. 23, 2014    (JP) .................... 2014-010166

(51) Int. Cl.
*G08G 1/01*    (2006.01)
*G08G 1/052*    (2006.01)
*G08G 1/16*    (2006.01)

(52) U.S. Cl.
CPC ............. *G08G 1/052* (2013.01); *G08G 1/166* (2013.01); *B60R 2300/301* (2013.01);
(Continued)

(58) Field of Classification Search
CPC ............ G06K 9/00812; B62D 15/0275; B62D 15/02; B60R 1/00; G08G 1/166; G08G 1/167; G08G 1/168
(Continued)

(56) References Cited

U.S. PATENT DOCUMENTS 8,503,729 B2 * 8/2013 Kumagai .............. G06T 7/0065
348/118
2003/0197660 A1 * 10/2003 Takahashi .............. G08G 1/168
345/7

(Continued)

FOREIGN PATENT DOCUMENTS

JP    2003-116125 A    4/2003
JP    2012-257107 A    12/2012

*Primary Examiner* — Hoi Lau
(74) *Attorney, Agent, or Firm* — Sughrue Mion, PLLC

(57) ABSTRACT

When a vehicle speed is equal to or lower than a vehicle speed threshold value, a display displays an imaged image in which an icon is displayed at the position corresponding to the object as an overhead view display image. When the vehicle speed exceeds the vehicle speed threshold value, the display displays an icon display image in which the icon is displayed at the position corresponding to the object as the overhead view display image. Though the overhead view display image displayed on the display is switched between the imaged image and the icon display image according to the change of the vehicle speed, the icon representing the object can continuously be displayed.

6 Claims, 6 Drawing Sheets

(52) U.S. Cl.
CPC ... *B60R 2300/305* (2013.01); *B60R 2300/607* (2013.01); *B60R 2300/70* (2013.01); *B60R 2300/8093* (2013.01)

(58) Field of Classification Search
USPC ............ 340/936, 932.2, 435; 348/148, 135; 382/104, 103, 199
See application file for complete search history.

(56) References Cited

U.S. PATENT DOCUMENTS

| | | | | |
|---|---|---|---|---|
| 2006/0119472 | A1* | 6/2006 | Tsuboi | B60Q 9/005 340/435 |
| 2007/0132563 | A1* | 6/2007 | Balbale | B60Q 9/004 340/435 |
| 2009/0257659 | A1* | 10/2009 | Suzuki | B60R 1/00 382/199 |
| 2010/0238051 | A1* | 9/2010 | Suzuki | B60R 1/00 340/932.2 |
| 2012/0105643 | A1* | 5/2012 | Ozaki | B60R 1/00 348/148 |
| 2013/0063601 | A1* | 3/2013 | Wakabayashi | B60R 1/00 348/148 |
| 2014/0063197 | A1 | 3/2014 | Yamamoto et al. | |
| 2015/0116494 | A1* | 4/2015 | Esaka | G06T 3/0018 348/148 |
| 2015/0186733 | A1* | 7/2015 | Hayakawa | G08G 1/166 382/103 |
| 2015/0222858 | A1* | 8/2015 | Tanuki | B60R 1/00 348/148 |
| 2015/0302574 | A1* | 10/2015 | Muramatsu | B62D 15/0275 348/148 |
| 2015/0310285 | A1* | 10/2015 | Ogata | B60R 1/00 382/104 |
| 2015/0317526 | A1* | 11/2015 | Muramatsu | G06K 9/00812 348/148 |
| 2016/0321920 | A1* | 11/2016 | Hayasaka | G08G 1/166 |

* cited by examiner

VEHICLE SURROUNDINGS MONITORING DEVICE

CROSS REFERENCE TO RELATED APPLICATIONS

This application is a National Stage of International Application No. PCT/JP2014/084748 filed Dec. 25, 2014, claiming priority based on Japanese Patent Application No. 2014-010166, filed Jan. 23, 2014, the contents of all of which are incorporated herein by reference in their entirety.

TECHNICAL FIELD

An embodiment of the present invention relates to a vehicle surroundings monitoring device.

BACKGROUND ART

A device for monitoring an object existing outside a host vehicle by imaging an image of the exterior of the host vehicle is proposed. For example, a device disclosed in Literature 1 displays an icon for a user to instruct the switching of the image of the surroundings of the vehicle on a screen in a superimposed manner.

CITATION LIST

Patent literature

[Patent Literature 1] Japanese Unexamined Patent Application Publication No. 2003-116125

SUMMARY OF INVENTION

Technical Problem

Incidentally, in a device for monitoring an object outside a host vehicle, it is required that a driver of a host vehicle more easily recognize the object outside the host vehicle.

An embodiment of the present invention is derived considering the above problem, and it is desirable to provide a vehicle surroundings monitoring device by which the object can more easily be recognized.

Solution to Problem

A vehicle surroundings monitoring device according to an embodiment of the present invention includes: an image data acquisition unit configured to acquire image data of the exterior of the host vehicle; an object detection unit configured to detect an object outside the host vehicle; a vehicle speed detection unit configured to detect a vehicle speed of the host vehicle; a first overhead view display image data generation unit configured to generate first overhead view display image data of the surroundings of the host vehicle from the image data; a second overhead view display image data generation unit configured to generate second overhead view display image data of surroundings of the host vehicle which displays the object as an icon from a detection result of the object detection unit; an overhead view display image generation unit configured to generate an overhead view display image of the surroundings of the host vehicle based on the first overhead view display image data and the second overhead view display image data; and a display unit configured to display the overhead view display image. When the vehicle speed is equal to or lower than a threshold value, the overhead view display image generation unit generates an imaged image in which the icon is displayed at the position corresponding to the object as the overhead view display image, using the first overhead view display image data and the second overhead view display image data. When the vehicle speed exceeds the threshold value, the overhead view display image generation unit generates an icon display image in which the icon is displayed at the position corresponding to the object as the overhead view display image, using the second overhead view display image data.

According to this configuration, when the vehicle speed is equal to or lower than a threshold value, the display unit displays the imaged image in which the icon is displayed at the position corresponding to the object as the overhead view display image. On the other hand, when the vehicle speed exceeds the threshold value, the display unit displays the icon display image in which the icon is displayed at the position corresponding to the object as the overhead view display image. For this reason, even though the overhead view display image displayed on the display unit is switched between the imaged image and the icon display image according to the change of the vehicle speed, the icon representing the object can be displayed continuously. Therefore, it is easy to recognize the object.

In this case, the overhead view display image generation unit can generate the imaged image in which an icon non-display area where the icon is not displayed around the host vehicle is included.

When the object exists at a short distance from the host vehicle, in some cases, a fine driving operation with respect to the object is needed. Therefore, according to the present embodiment, regarding the object in the icon non-display area which exists at the short distance from the host vehicle, the icon representing the object is not displayed. For this reason, it is possible to prevent the recognizing of the object in the overhead view display image from being blocked by the icon.

When the vehicle speed is equal to or lower than the threshold value, the overhead view display image generation unit can generate the imaged image that displays the icon representing the object outside an imaging range of the image data acquisition unit in the imaged image.

According to this configuration, regarding the object outside the imaging range of the image data acquisition unit, the icon representing the object is displayed. For this reason, the object outside the imaging range of the image data acquisition unit can be recognized by the icon.

In this case, the overhead view display image generation unit can generate the imaged image of which the scale becomes smaller as the vehicle speed increases.

As the vehicle speed increases, the necessity for precisely recognizing the narrow range decreases, and thus, the necessity for recognizing the wide range increases. According to the configuration described above, as the vehicle speed increases, the scale of the imaged image becomes smaller. Therefore, according to the increase of the vehicle speed, it is possible to expand the area from which the information is obtained.

Advantageous Effects of Invention

According to a vehicle surroundings monitoring device in an embodiment of the present invention, it is easy to recognize an object.

DESCRIPTION OF EMBODIMENTS

Figure 1:
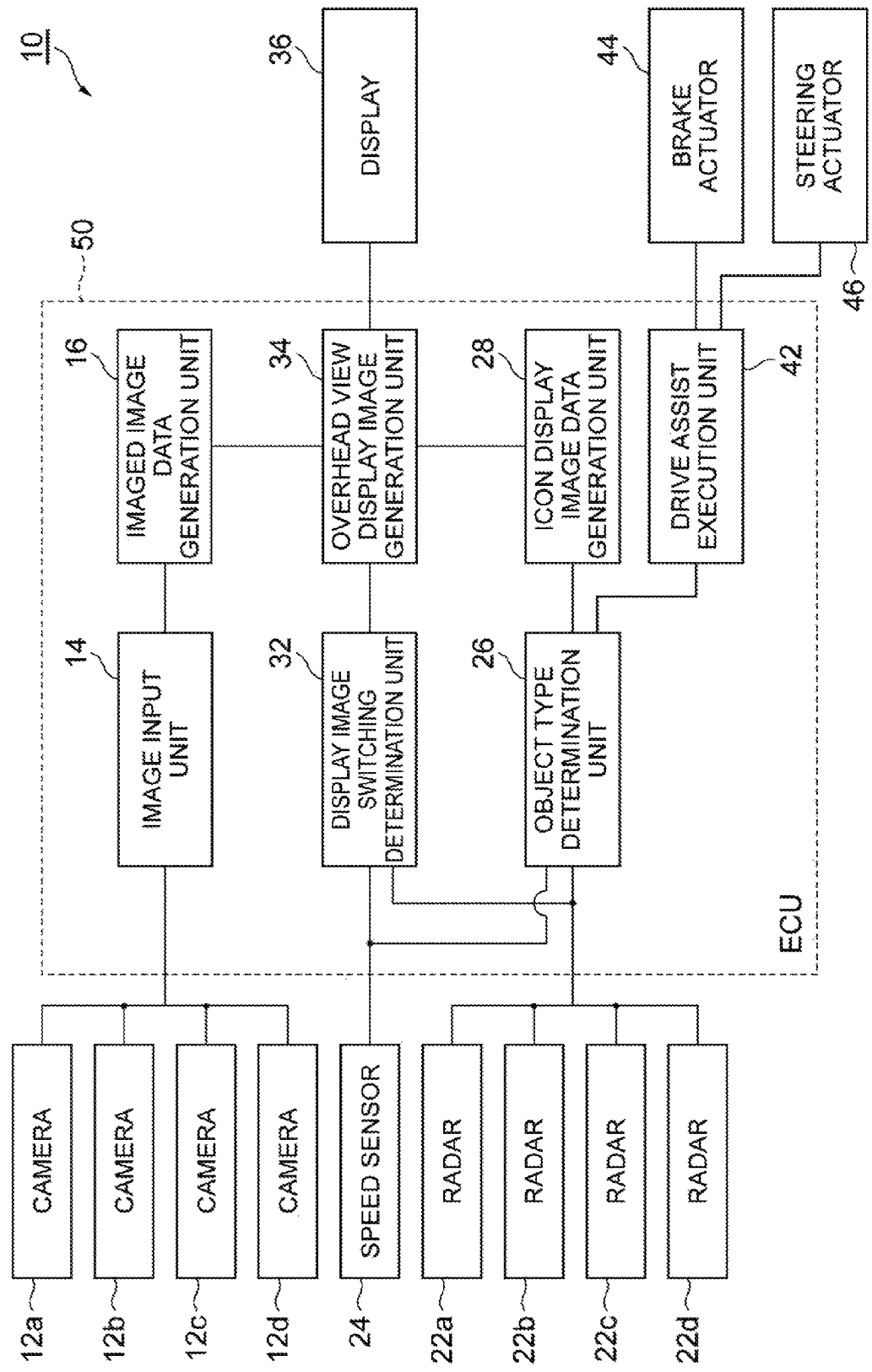
FIG. 1 is a block diagram illustrating a configuration of a vehicle surroundings monitoring device in an embodiment.

Hereinafter, a vehicle surroundings monitoring device in an embodiment of the present invention will be described referring to the drawings. As illustrated in FIG. 1, a vehicle surroundings monitoring device 10 in the embodiment includes cameras 12a to 12d, radars 22a to 22d, a speed sensor 24, an ECU 50, a display 36, a brake actuator 44, and a steering actuator 46. The vehicle surroundings monitoring device 10 is mounted on a host vehicle. The vehicle surroundings monitoring device 10 monitors an object outside the host vehicle. The vehicle surroundings monitoring device 10 performs a drive assist by intervening in the driver's driving operation with respect to the object outside the host vehicle.

The cameras 12a to 12d function as an image data acquisition unit that acquires images of the exterior of the host vehicle. The image data is data that specifies the image obtained by optical devices such as the cameras 12a to 12d by a position, tone, and color of each of a plurality of pixels contained in the image. The cameras 12a to 12d are monocular cameras in which a semiconductor device such as a CCD or a CMOS is used. On the cameras 12a to 12d, a wide-angle lens or a fish-eye lens is mounted.

In the embodiment, each of the four cameras 12a to 12d on which a wide-angle lens or a fish-eye lens is mounted is installed on the front, rear, right and left sides of a body of the host vehicle respectively. By the cameras 12a to 12d, entire surroundings outside the host vehicle can be imaged. Optical axes of the cameras 12a to 12d are directed downward at a predetermined angle. For this reason, imaging ranges of the cameras 12a to 12d are areas approximately 2 or 3 m from each of the front side, right and left sides, and rear side of the host vehicle.

The radars 22a to 22d function as an object detection unit that detects an object outside the host vehicle. In the present embodiment, the object outside the host vehicle which is detected by the object detection unit is an object which has a possibility of moving such as another vehicle, a motorcycle, a bicycle, a pedestrian and the like. In the present embodiment, a fixed obstacle such as a building, a guard rail, or the like can also be assumed to be an object outside the host vehicle detected by the object detection unit.

Millimeter wave radar or laser radar can be used as the radars 22a to 22d. The radars 22a to 22d can detect the distance, a direction, a position, a size, and a relative speed of the object outside the host vehicle. In the present embodiment, each of the four radars 22a to 22d are installed on the front, right and left, and rear sides of a body of the host vehicle respectively. By the radars 22a to 22d, all the objects existing in the entire surroundings outside the host vehicle can be detected. By the radars 22a to 22d, objects existing outside the imaging range of the cameras 12a to 12d can be detected. In order to detect objects existing a short distance from the host vehicle, each of four sets of sonar installed on the front, right and left, and rear sides of the body of the host vehicle can be used as an object detection unit.

The speed sensor 24 functions as a vehicle speed detection unit that detects the speed of the host vehicle. The speed sensor 24 detects the speed of the host vehicle from a rotation speed of an axle of the host vehicle.

The electronic control unit (ECU) 50 controls the display 36, the brake actuator 44, and the steering actuator 46 based on the information obtained by the radars 22a to 22d and the speed sensor 24. The ECU 50 includes an image input unit 14, an imaged image data generation unit 16, an object type determination unit 26, an icon display image data generation unit 28, a display image switching determination unit 32, an overhead view display image generation unit 34, and a drive assist execution unit 42.

The image input unit 14 and the imaged image data generation unit 16 function as the first overhead view display image data generation unit that generates imaged image data which is the first overhead view display image data of the surroundings of the host vehicle, from image data of the exterior of the host vehicle imaged by the cameras 12a to 12d. The first overhead view display image data is the data of the image of a perspective from above the periphery of the host vehicle generated based on the image data of the exterior of the host vehicle. The image input unit 14 acquires image data imaged by the cameras 12a to 12d. The image input unit 14 acquires the image data of four still images imaged by the cameras 12a to 12d for each constant update cycle of frames.

The imaged image data generation unit 16 converts each of the pieces of image data of the still images of perspectives from four horizontal directions acquired by the image input unit 14 into a image data of the perspective from above the periphery of the host vehicle. The imaged image data generation unit 16 synthesizes the four pieces of image data of the still images of the perspective from above the periphery of the host vehicle so as to become one continuous piece of imaged image data by correcting their boundaries. In this way, the imaged image data generation unit 16 generates the imaged image data which is the first overhead view display image data of surroundings of the host vehicle from the image data of the still image acquired by the image input unit 14.

For example, the imaged image data can be generated as imaged image data of a perspective from above the periphery of the host vehicle in the vertical direction with respect to the ground surface. The imaged image data can be generated as imaged image data of a perspective from above the periphery of the host vehicle from a direction other than the vertical direction with respect to the ground surface.

The object type determination unit 26 and the icon display image data generation unit 28 function as the second overhead view display image data generation unit that generates icon display image data which is the second overhead view display image data of surroundings of the host vehicle, which illustrates the object as an icon, from the detection results of the radars 22a to 22d. An icon is a symbol that represents the object. The second overhead view display image data is the data of a drawing of a perspective around the host vehicle from above the host vehicle, on which the icon representing the object is illustrated at the position corresponding to the object.

The object type determination unit 26 acquires information on a size of the object from the radars 22a to 22d. The object type determination unit 26 acquires information on the ground speed of the object based on the relative speed between the object detected by the radars 22a to 22d and the host vehicle, and the vehicle speed of the host vehicle acquired by the speed sensor 24. The object type determination unit 26 determines the type of the object such as another vehicle, a motorcycle, a bicycle, and a pedestrian, and the like from the acquired information on the ground speed of the object and the size. The object type determination unit 26 transmits the information on the distance, the direction, and the position of the object detected by radars 22a to 22d to the icon display image data generation unit 28. The object type determination unit 26 transmits the information on the distance, the relative speed and direction of the object with respect to the host vehicle detected by the radars 22a to 22d to the drive assist execution unit 42.

The icon display image data generation unit 28, from the icons prepared in advance for each type of object such as another vehicle, a motorcycle, a bicycle, a pedestrian and the like, selects an icon matching the type of the object determined by the object type determination unit 26. The icon display image data generation unit 28 generates the icon display image data which is the second overhead view display image data of surroundings of the host vehicle on which the object is illustrated as the icon, based on the information of the distance and the direction between the object and the host vehicle transmitted from the object type determination unit 26.

For example, the icon display image data can be the icon display image data of a perspective from above the host vehicle in the vertical direction with respect to the ground surface. The icon display image data can be the icon display image data of a perspective from above the host vehicle from a direction other than the vertical direction with respect to the ground surface. It is possible to match the perspective from above the host vehicle in the imaged image data and the perspective from above the host vehicle in the icon display image data.

The display image switching determination unit 32 and the overhead view display image generation unit 34 function as an overhead view display image generation unit that generates the overhead view display image of surroundings of the host vehicle based on the imaged image data and the icon display image data. The overhead view display image is the imaged image or the drawing of the perspective from above the host vehicle generated based on the first overhead view display image data and the second overhead view display image data.

The display image switching determination unit 32, as described below, determines which of the imaged image or the icon display image to display as the overhead view display image based on the vehicle speed of the host vehicle detected by the speed sensor 24. The imaged image is generated using the imaged image data and the icon display image data, and is the overhead view display image of surroundings of the host vehicle wherein the icon is displayed at the position corresponding to the object. The icon display image is generated using the icon display image data, and is the overhead view display image of surroundings of the host vehicle wherein the icon is displayed at the position corresponding to the object. The display image switching determination unit 32 determines whether or not to display the icon representing the object detected by radars 22a to 22d based on the distance, the direction and the position between the object, and the host vehicle.

The overhead view display image generation unit 34 generates the overhead view display image of surroundings of the host vehicle by an instruction from the display image switching determination unit 32 based on the imaged image data and the icon display image data. The overhead view display image can be the overhead view display image of the perspective from above the host vehicle in the vertical direction with respect to the ground surface. The overhead view display image can be the overhead view display image of the perspective from above the host vehicle from a direction other than the vertical direction.

The drive assist execution unit 42 intervenes in the driver's driving operation and provides an instruction signal to increase the braking force or an instruction signal to change the steering angle of the host vehicle based on the information on the type of the object determined by the object type determination unit 26 and the information transmitted from the object type determination unit 26 on the distance between the object and the host vehicle, the relative speed and the direction. The drive assist execution unit 42 provides the instruction signal to increase the braking force or the instruction signal to change the steering angle of the host vehicle when the distance between the object and the host vehicle is equal to or smaller than a predetermined distance of an assist threshold value according to the type of the object, or when the time until the object and the host vehicle will come in contact with each other is equal to or smaller than a predetermined time of an assist threshold value.

The display 36 functions as a display unit that displays the overhead view display image. The display 36 presents the display image generated by the overhead view display image generation unit 34 to the driver of the host vehicle. Generally, a liquid crystal monitor or a monitor for the navigation device can be applied to the display unit. A head-up display can be applied to the display unit. A display unit mountable on the body of the driver of the host vehicle can be used as the display unit. As the display unit mountable on the driver's body of the host vehicle, for example, a display unit that has a shape of glasses mountable on the driver's body, and in which the overhead view display image is displayed on the lens of the glasses can be used.

When the distance between the object and the host vehicle is equal to or smaller than the predetermined distance of the assist threshold value or when the time until the object and the host vehicle come in contact with each other is equal to or smaller than the predetermined time of the assist threshold value, the brake actuator 44 causes the braking force to be increased based on the instruction signal from the drive assist execution unit 42. When the distance between the object and the host vehicle is equal to or smaller than the predetermined distance of the assist threshold value or when the time until the object and the host vehicle will come in contact with each other is equal to or smaller than the predetermined time of the assist threshold value, the steering actuator 46 causes the steering angle of the host vehicle to be changed based on the instruction signal from the drive assist execution unit 42.

Figure 2:
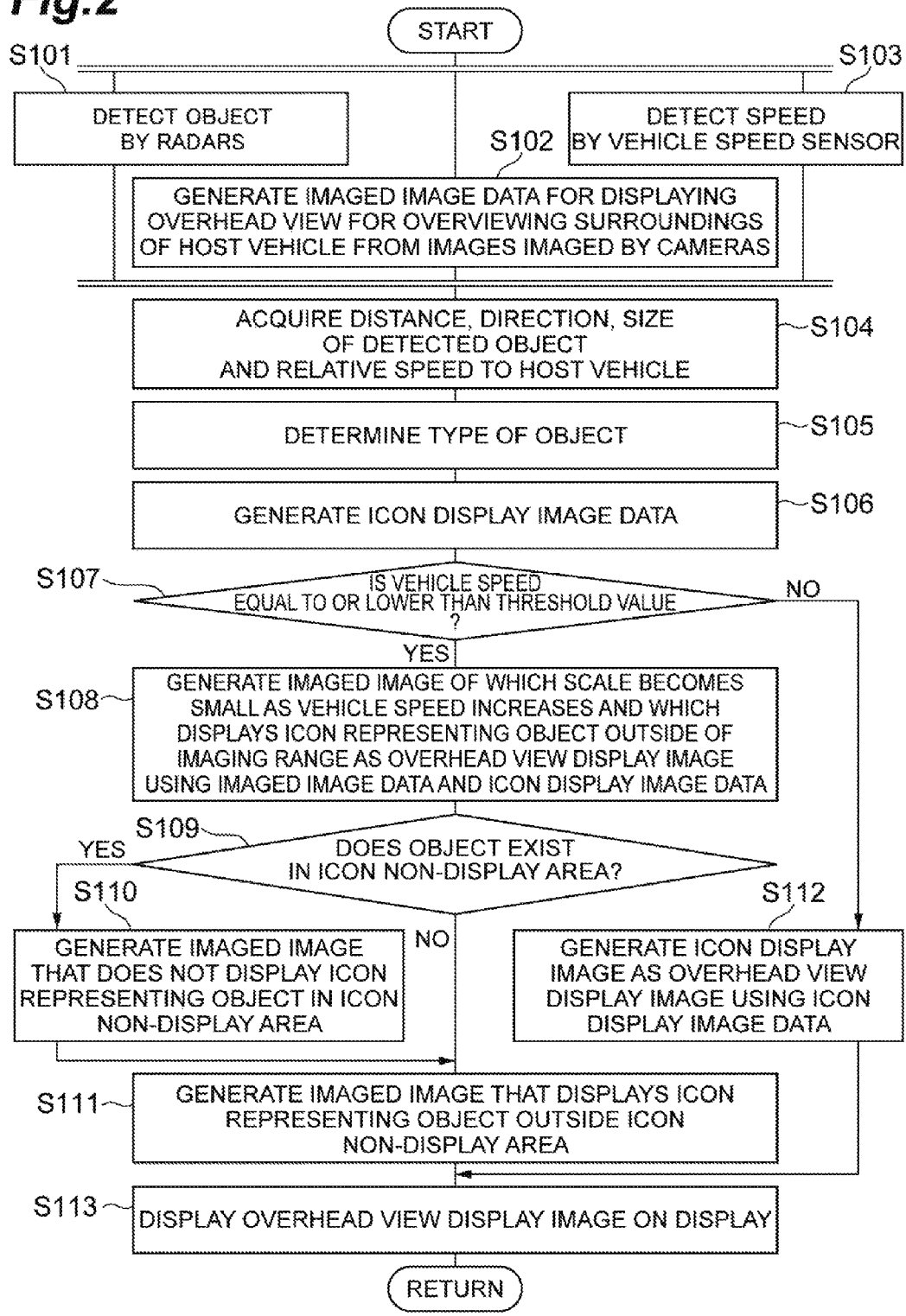
FIG. 2 is a flow chart illustrating an operation of the vehicle surroundings monitoring device in the embodiment.

Hereinafter, an operation of the vehicle surroundings monitoring device 10 in the present embodiment will be described. As illustrated in FIG. 2, the radars 22a to 22d detect the object outside the host vehicle (S101). The imaged image data generation unit 16 generates the imaged image data for displaying the overhead view from the images imaged by the cameras 12a to 12d (S102). The speed sensor 24 detects the vehicle speed of the host vehicle (S103).

The object type determination unit 26 and the display image switching determination unit 32 acquire the information on the distance, the direction, the position of the object and the relative speed to the host vehicle detected by the radars 22a to 22d (S104). The object type determination unit 26 determines the type of the object such as another vehicle, a motorcycle, a bicycle, a pedestrian and the like according to the information regarding the ground speed of the object and the size (S105). The icon display image data generation unit 28 selects the icon that matches the types of the object determined by the object type determination unit 26, and generates the icon display image data of surroundings of the host vehicle based on the information on the distance, the direction, and the position between the object and the host vehicle transmitted from the object type determination unit 26 (S106).

The display image switching determination unit 32 determines whether or not the vehicle speed detected by the speed sensor 24 is equal to or lower than a vehicle speed threshold value (S107). The vehicle speed threshold value, for example, in a case where the transmission of the host vehicle is an automatic transmission, can be a maximum speed while a creeping without the accelerator pedal being depressed. Specifically, the vehicle speed threshold value can be 5 to 20 km/h. The vehicle speed threshold value can be a fixed value. The driver of the host vehicle can set any vehicle speed threshold value. The vehicle speed threshold value can be varied according to the situation.

When the vehicle speed detected by the speed sensor 24 is equal to or lower than the vehicle speed threshold value (S107), the overhead view display image generation unit 34 generates the imaged image in which the icon is displayed at the position corresponding to the object, as the overhead view display image by the instruction from the display image switching determination unit 32, using the imaged image data and the icon display image data (S108). Specifically, the overhead view display image generation unit 34 generates the imaged image of which the scale becomes smaller as the vehicle speed increases and which displays the icon representing an object outside the imaging range of the cameras 12a to 12d, as the overhead view display image.

The display image switching determination unit 32 determines whether or not the object exists in the icon non-display area where the icon is not displayed around the host vehicle (S109). The icon non-display area, for example, can be a rectangular area in the overhead view display image and each side of the rectangular area is away from the front, right and left, and rear sides of the host vehicle by approximately 1 to 2 m respectively. Alternatively, the icon non-display area can be an area having a shape other than a rectangular shape. The icon non-display area can be a fixed area. The icon non-display area can be arbitrarily set by the driver of the host vehicle. The icon non-display area can be varied according to the situation.

When the object exists in the icon non-display area (S109), the overhead view display image generation unit 34 generates the imaged image that does not display the icon representing the object in the icon non-display area by the instruction from the display image switching determination unit 32 (S110). The overhead view display image generation unit 34 generates the imaged image that displays the icon representing the object outside the icon non-display area regardless of whether or not the object exists in the icon non-display area (S111). The display 36 displays the generated overhead view display image (S113).

Returning to S107, when the display image switching determination unit 32 determines that the vehicle speed detected by the speed sensor 24 exceeds the vehicle speed threshold value (S107), the overhead view display image generation unit 34 generates the icon display image in which the icon is displayed at the position corresponding to the object as the overhead view display image by the instruction from the display image switching determination unit 32, using the icon display image data (S112). The display 36 displays the generated overhead view display image (S113).

The STEPs S107 to S113 will be described in detail. In the example below, the vehicle speed threshold value is assumed to be vth=10 km/h. In the example below, the icon non-display area is assumed to be a rectangular area in the overhead view display image, and each of the sides of the rectangular area is away from the front, right and left, and rear sides of the host vehicle by 1 m respectively. The imaging range of the cameras 12a to 12d is assumed to be an area that is away from the front, right and left, and rear sides of the host vehicle by 2 m respectively.

Figure 3:
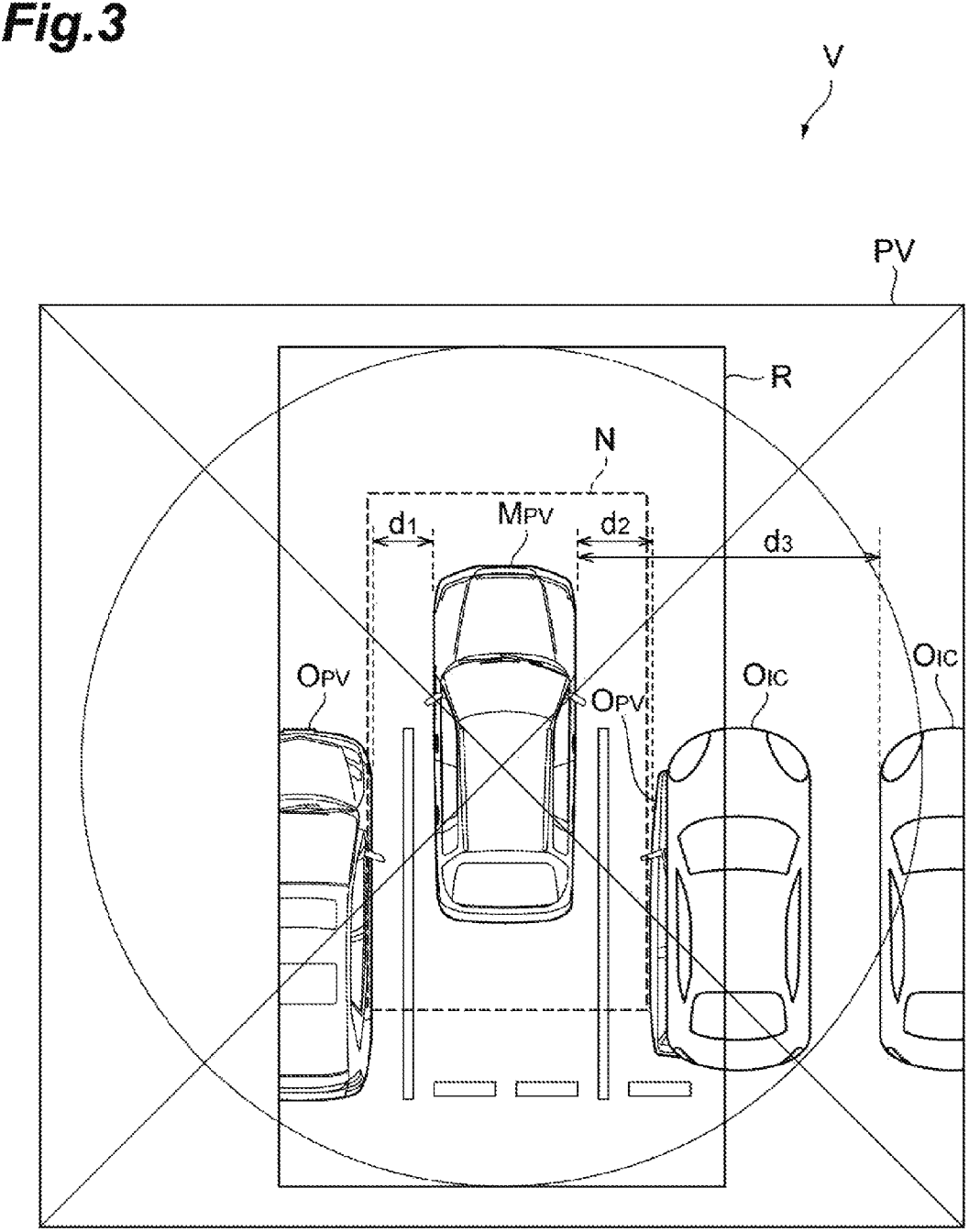
FIG. 3 is a diagram illustrating an overhead view display image displayed on a display when a vehicle speed is equal to or lower than the threshold value and an object exists in an icon non-display area.

First, as illustrated in FIG. 3, for example, it is assumed that the host vehicle is coming out from a parking lot or the host vehicle is parked in the parking lot. In this case, the vehicle speed of the host vehicle is equal to or lower than the vehicle speed threshold value vth, and is an extremely low speed of 1 to 3 km/h. As illustrated in FIG. 3, the overhead view display image generation unit 34 generates an imaged image PV of surroundings of the host vehicle imaged image $M_{PV}$ of the perspective from above the host vehicle (S107 and S108).

In a case where the object exists within the extremely short distance of equal to or less than 1 m from the front, right and left, and rear sides of the host vehicle, a fine driving operation with respect to the object is required. However, when the icon is displayed for the object within the extremely short distance to the host vehicle, there is a case where the object in the imaged image PV is prevented from being recognized.

Therefore, in the present embodiment, as illustrated in FIG. 3, regarding another vehicle imaged image of another vehicle existing within a distance $d_1=0.7$ m in the icon non-display area N, the overhead view display image generation unit 34 generates the imaged image PV that displays another vehicle imaged image $O_{PV}$ only and not the icon representing said vehicle in the icon non-display area N as the overhead view display image V (S110).

On the other hand, regarding another vehicle imaged image $O_{PV}$ of another vehicle existing within $d_2=1.1$ m outside the icon non-display area N, the overhead view display image generation unit 34 generates the imaged image PV in which another vehicle icon $O_{IC}$ representing said vehicle is superimposed on another vehicle imaged image $O_{PV}$ in the area outside the icon non-display area N, as the overhead view display image V (S111).

Furthermore, regarding another vehicle existing within $d_3=4.5$ m outside the imaging range R of the cameras 12a to 12d, the overhead view display image generation unit 34 generates the imaged image PV displaying another vehicle icon $O_{IC}$ which is an icon representing said vehicle at the position corresponding to the position of said vehicle outside the imaging range R, as the overhead view display image V (S108).

In the example above, since the object outside the host vehicle is another vehicle, the overhead view display image generation unit 34 generates the imaged image PV that includes another vehicle icon $O_{IC}$ representing the vehicle selected by the icon display image data generation unit 28.

However, in a case where the type of the object is determined to be a motorcycle, a bicycle, a pedestrian or the like by the object type determination unit 26, the icon display image data generation unit 28 selects the icon that matches the type of the object. The overhead view display image generation unit 34 generates the imaged image PV that includes the icon corresponding to the type of the object such as a motorcycle, a bicycle, a pedestrian and the like.

When the vehicle speed is in the range of equal to or lower than the above described vehicle speed threshold value vth, for example, is a low speed range of 1 to 3 km/h, the overhead view display image generation unit 34 can generate the imaged image PV that displays only the imaging range R of the cameras 12a to 12d or the icon non-display area N, as the overhead view display image V.

Figure 4:
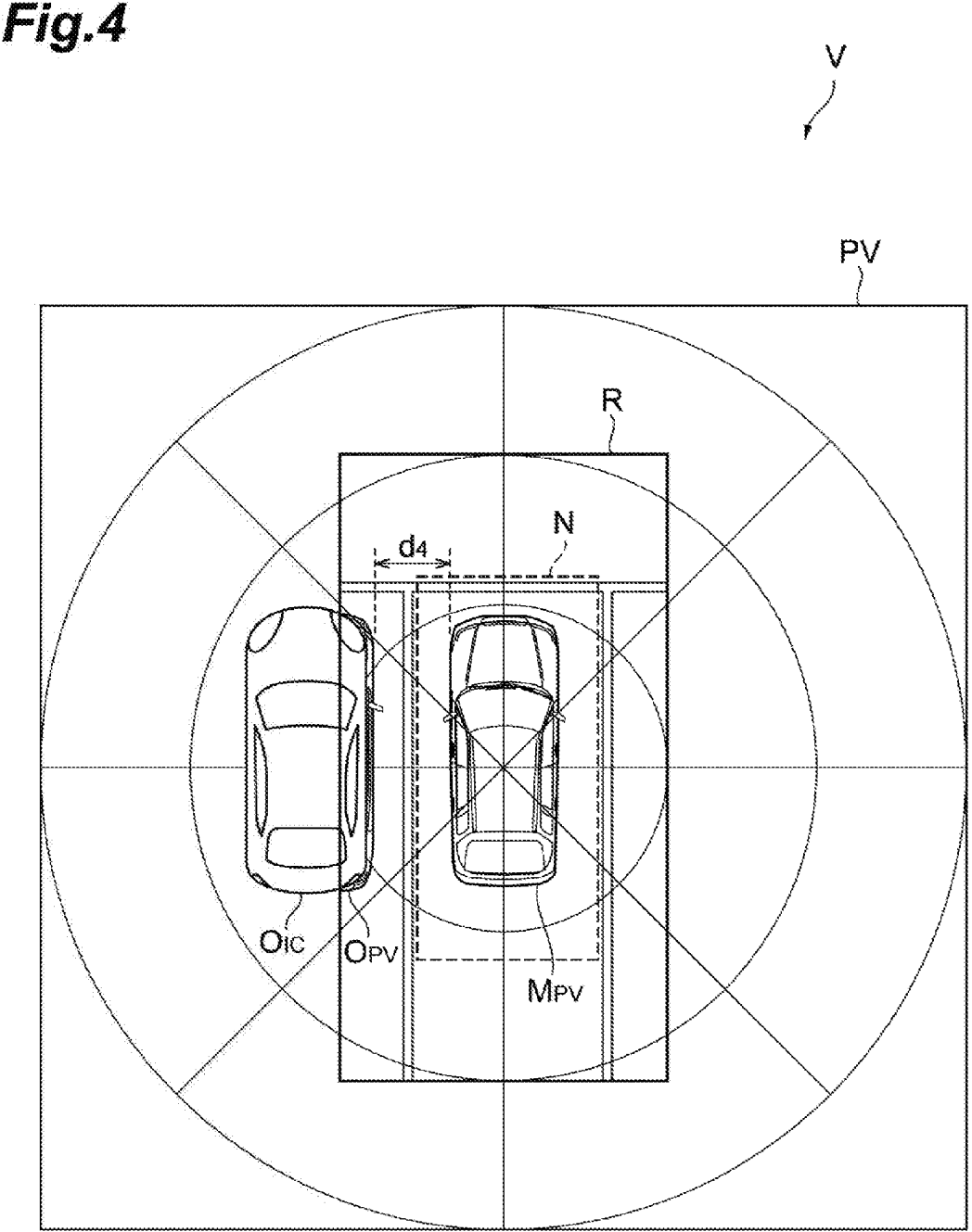
FIG. 4 is a diagram illustrating an overhead view display image displayed on the display when the vehicle speed is equal to or lower than the threshold value and higher than that in FIG. 3 and an object does not exist in the icon non-display area.

Next, as illustrated in FIG. 4, for example, a case where the host vehicle starts from a stop line at an intersection is assumed. In this case, the vehicle speed of the host vehicle is equal to or lower than the vehicle speed threshold value vth, but is 3 to 7 km/h which is higher than the speed in FIG. 3. The overhead view display image generation unit 34 generates the imaged image PV of which the scale is small compared to the scale of imaged image PV in FIG. 3, as the overhead view display image V (S108).

In the example in FIG. 4, another vehicle exists within a distance $d_4=1.3$ m outside the icon non-display area N. Therefore, regarding another vehicle imaged image $O_{PV}$ of the other vehicle at the distance $d_4$, the overhead view display image generation unit 34 generates the overhead view display image V in which another vehicle icon $O_{IC}$ representing the vehicle is superimposed on another vehicle imaged image $O_{PV}$ in the area outside the icon non-display area N, as the overhead view display image V (S111).

Figure 5:
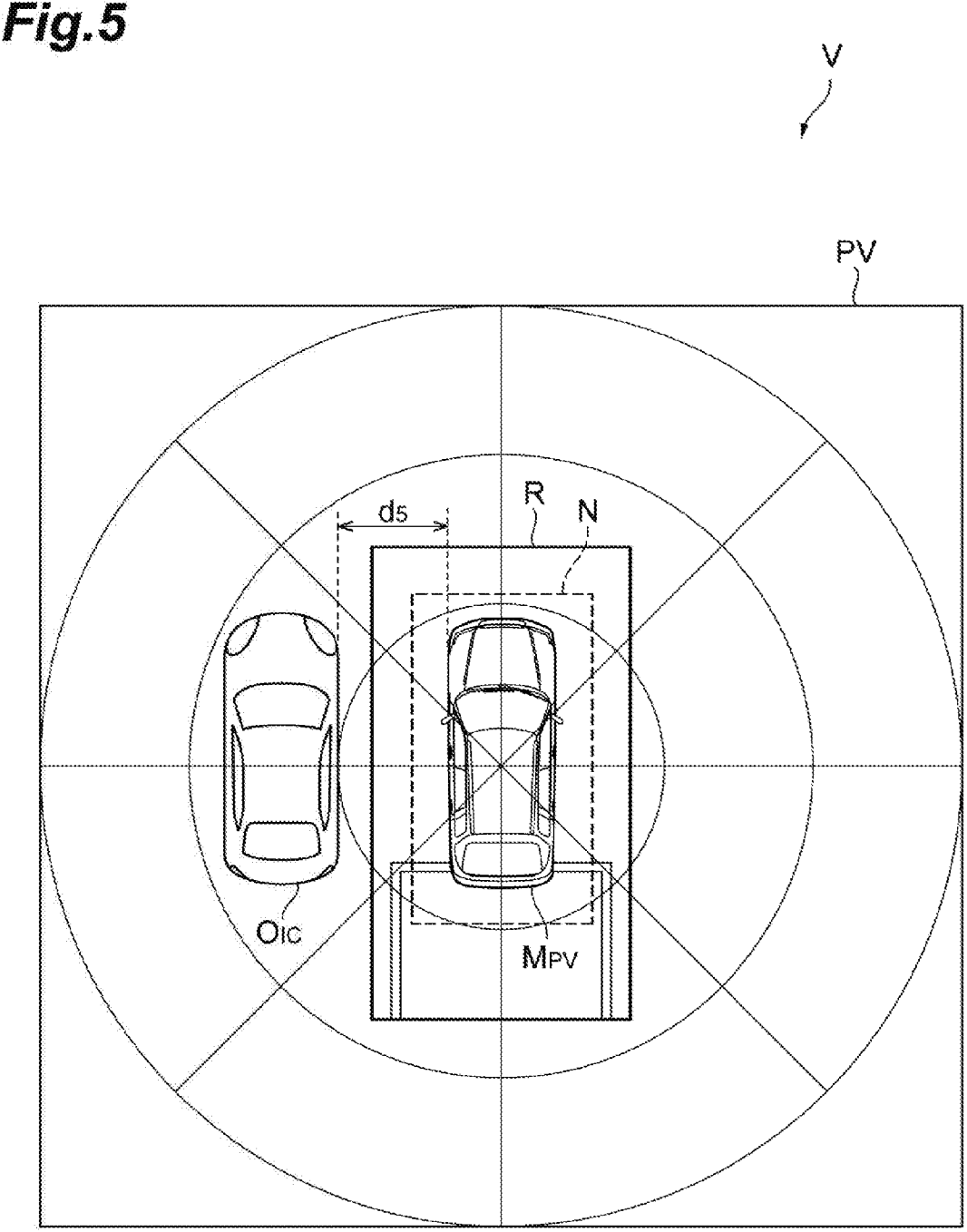
FIG. 5 is a diagram illustrating an overhead view display image displayed on the display when the vehicle speed is equal to or lower than the threshold value and higher than that in FIG. 4.

Next, as illustrated in FIG. 5, a case where the host vehicle further accelerates from the state illustrated in FIG. 4 is assumed. In this case, the vehicle speed of the host vehicle is equal to or lower than the vehicle speed threshold value vth, but is 7 to 10 km/h which is higher than the speed in FIG. 4. The overhead view display image generation unit 34 generates the imaged image PV of which the scale is small compared to the scale of imaged image PV in FIG. 4, as the overhead view display image V (S108).

In the example in FIG. 5, another vehicle exists within a distance $d_5=2.1$ m in the icon non-display area N and outside the imaging range R of the cameras 12a to 12d. Therefore, regarding another vehicle imaged image $O_{PV}$ of said vehicle at the distance $d_5$, the overhead view display image generation unit 34 generates the overhead view display image V that includes another vehicle icon $O_{IC}$ which is the icon representing said vehicle in the area outside the imaging range R, as the overhead view display image V (S111).

Figure 6:
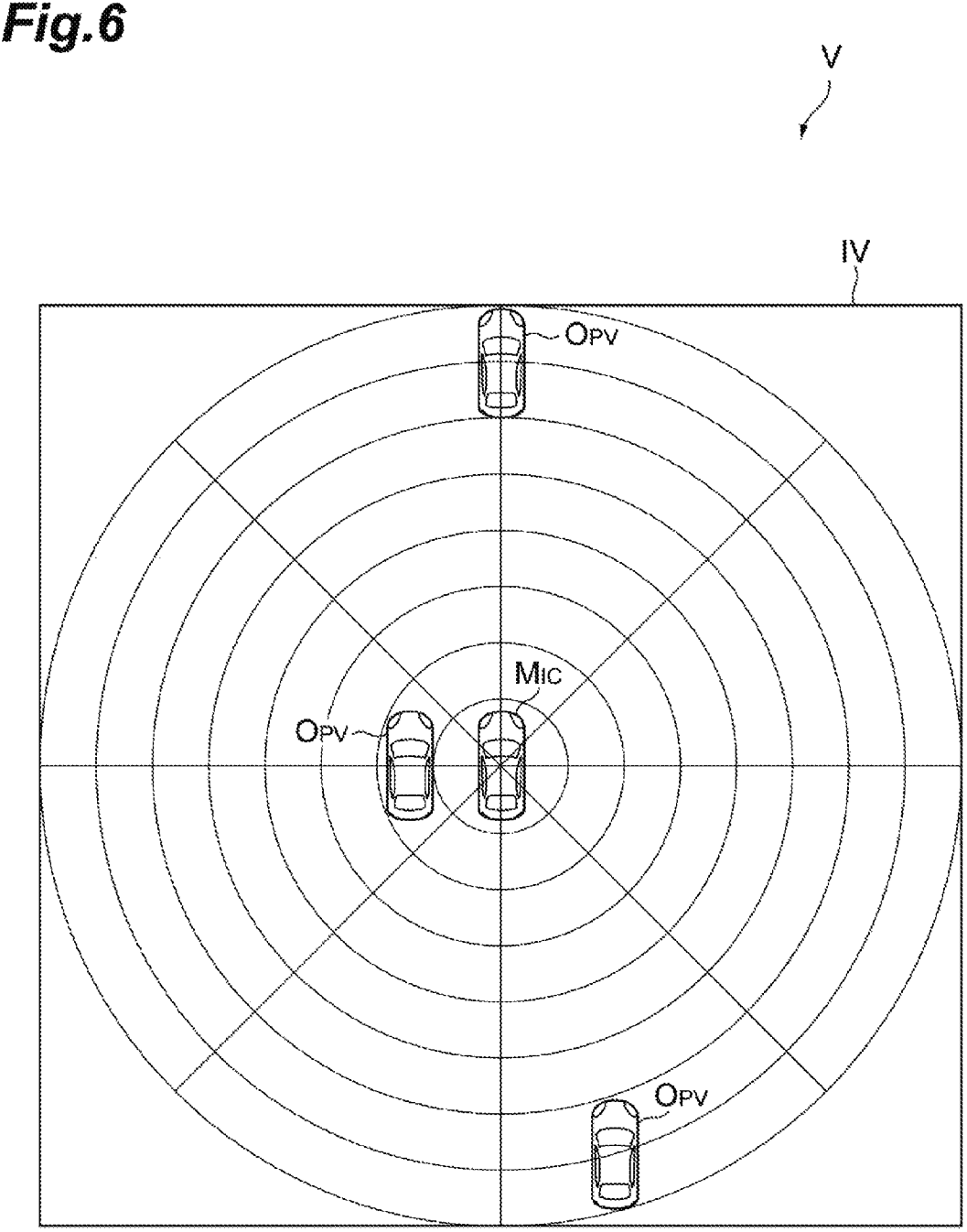
FIG. 6 is a diagram illustrating an overhead view display image displayed on the display when the vehicle speed is a speed exceeding the threshold value.

Furthermore, as illustrated in FIG. 6, for example, a case where the host vehicle is traveling on an automobile road is assumed. In this case, the vehicle speed of the host vehicle is 11 to 100 km/h which exceeds the vehicle speed threshold value vth. The overhead view display image generation unit 34 generates the icon display image IV as the overhead view display image V (S112). The overhead view display image generation unit 34 generates the icon display image IV in which the host vehicle icon $M_{IC}$ representing the host vehicle is displayed at the center of the icon display image IV and another vehicle icon $O_{IC}$ is displayed at the position corresponding to the vehicle, in the area of icon display image IV, as the overhead view display image V.

Even in a case where the overhead view display image generation unit 34 generates the icon display image IV as the overhead view display image V, similar to an above-described case of generating the imaged image PV as the overhead view display image V, the overhead view display image generation unit 34 generates the icon display image IV that includes the icons corresponding to the types of the object such as a motorcycle, a bicycle, a pedestrian and the like.

When the vehicle speed of the host vehicle exceeds the vehicle speed threshold value vth, the imaged image PV is not displayed and even if the objects exist at the short distance in the icon non-display area N, a fine driving operation with respect to the object is not necessary. For this reason, when the vehicle speed of the host vehicle exceeds the vehicle speed threshold value vth, the overhead view display image generation unit 34 generates the icon display image IV that includes another vehicle icon $O_{IC}$ representing the vehicle regardless of whether or not the object exists in the icon non-display area N.

As described above, when the vehicle speed of the host vehicle increases from the speed equal to or less than the vehicle speed threshold value vth to the speed exceeding the vehicle speed threshold value vth, the overhead view display image V continuously changes as illustrated in FIG. 3 to FIG. 6. On the other hand, when the vehicle speed of the host vehicle decreases from the speed exceeding the vehicle speed threshold value vth to the speed equal to or lower than the vehicle speed threshold value vth, reversely, the overhead view display image V continuously changes as illustrated in FIG. 6 to FIG. 3.

When the display 36 displays the overhead view display image V as described above, according to the type of the object, when the distance between the object and the host vehicle is equal to or smaller than a predetermined distance of an assist threshold value or when the time that the object and the host vehicle to be contact with each other is equal to or smaller than a predetermined time of an assist threshold value, the drive assist execution unit 42 provides an instruction signal to the brake actuator 44 to increase the braking force of the host vehicle, and provides an instruction signal to the steering actuator 46 to change the steering angle of the host vehicle.

In the present embodiment, when the vehicle speed is equal to or lower than the vehicle speed threshold value vth, the display 36 displays the imaged image PV in which the icon is displayed at the position corresponding to the object as the overhead view display image V. On the other hand, when the vehicle speed exceeds the vehicle speed threshold value vth, the display 36 displays the icon display image IV in which the icon is displayed at the position corresponding to the object as the overhead view display image V. For this reason, even though the overhead view display image V displayed on the display 36 is switched between the imaged image PV and the icon display image IV, the icon representing the object can be displayed continuously. Therefore, it is easy to recognize the object.

When the object exists at the short distance from the host vehicle, in some cases, a fine driving operation with respect to the object is necessary. Therefore, according to the present embodiment, regarding the object in the icon non-display area N which exists at the short distance from the host vehicle, the icon representing the object is not displayed. For this reason, it is possible to prevent the recognizing of the object in the overhead view display image V from being blocked by the icon.

In the present embodiment, regarding the object outside the imaging range R of the cameras 12a to 12d, the icon representing the object is displayed. For this reason, the object outside the imaging range R of the cameras 12a to 12d can be recognized by the icon.

As the vehicle speed increases, the necessity for precisely recognizing the narrow range decreases, and thus, the necessity for recognizing the wide range increases. Therefore, in the present embodiment, as the vehicle speed increases, the display scale of the imaged image PV becomes smaller. Therefore, according to the increase of the vehicle speed, it is possible to expand the area from which the information is obtained.

The imaged image PV is the image generated by a shift in perspective of the image imaged by the cameras 12a to 12d having a wide-angle lens or a fish-eye lens. For this reason, there is a case where the object in the imaged image PV is distorted, and it is difficult to recognize the object. However, in the present embodiment, regarding the object detected by radars 22a to 22d and which is outside the icon non-display area N, it is possible to recognize the object since the icon representing the object is displayed.

In the vehicle surroundings monitoring device 10, regarding the object that is not subject to be detected by the radars 22a to 22d, the icon regarding the object is not displayed. For this reason, in the present embodiment, the driver of the host vehicle can figure out the object subject to be recognized by the vehicle surroundings monitoring device 10. Furthermore, regarding the object that is not detected by the radars 22a to 22d, the icon regarding the object is not displayed. For this reason, in the present embodiment, the driver of the host vehicle can figure out the object that is not recognized by the vehicle surroundings monitoring device 10. Therefore, it is possible to prevent the driver of the host vehicle from over-confidence with respect to the vehicle surroundings monitoring device 10.

The vehicle surroundings monitoring device in the embodiment of the present invention is not limited to the above described embodiment, and it is needless to say that various modification can be made within the range not departing from the scope of the embodiment of the present invention. For example, in the embodiment described above, the description is focused on the aspect that the overhead view display image V of the perspective from above the host vehicle in the vertical direction with respect to the ground surface is displayed as the overhead view display image V. However, the embodiment of the present invention can also include an aspect that the overhead view display image V of the perspective from above the host vehicle in a direction other than the vertical direction with respect to the ground surface may sterically be displayed on the display 36 as the overhead view display image V.

REFERENCE SIGNS LIST 10 vehicle surroundings monitoring device, 12a to 12d camera, 14 image input unit, 16 image data generation unit, 22a to 22d radar, 24 speed sensor, 26 object type determination unit, 28 icon display image data generation unit, 32 display image switching determination unit, 34 overhead view display image generation unit, 36 display, 42 drive assist execution unit, 44 brake actuator, 46 steering actuator, 50 ECU, V overhead view display image, PV imaged image, IV icon display image, N icon non-display area, R imaging allowable range, $M_{PV}$ host vehicle imaged image, $O_{PV}$ another vehicle imaged image, $M_{IC}$ host vehicle icon, $O_{IC}$ another vehicle icon, $d_1$ to $d_5$ distance

The invention claimed is:

1. A vehicle surroundings monitoring device, comprising:
    an image data acquisition unit configured to acquire image data of the exterior of a host vehicle;
    an object detection unit configured to detect an object outside the host vehicle;
    a vehicle speed detection unit configured to detect a vehicle speed of the host vehicle;
    a first overhead view display image data generation unit configured to generate first overhead view display image data of surroundings of the host vehicle from the image data;
    a second overhead view display image data generation unit configured to generate second overhead view display image data of surroundings of the host vehicle which displays the object as an icon from a detection result of the object detection unit;
    an overhead view display image generation unit configured to generate an overhead view display image of surroundings of the host vehicle based on the first overhead view display image data and the second overhead view display image data; and
    a display unit configured to display the overhead view display image,
    wherein, when the vehicle speed is equal to or lower than a threshold value, the overhead view display image generation unit generates an imaged image in which the icon is displayed at the position corresponding to the object as the overhead view display image using the first overhead view display image data and the second overhead view display image data, and
    wherein, when the vehicle speed exceeds the threshold value, the overhead view display image generation unit generates an icon display image in which the icon is displayed at the position corresponding to the object as the overhead view display image using the second overhead view display image data.

2. The vehicle surroundings monitoring device according to claim 1,
    wherein the overhead view display image generation unit generates the imaged image in which an icon non-display area where the icon is not displayed around the host vehicle, is included.

3. The vehicle surroundings monitoring device according to claim 1,
    wherein, when the vehicle speed is equal to or lower than the threshold value, the overhead view display image generation unit generates the imaged image that displays the icon representing the object outside an imaging range of the image data acquisition unit in the imaged image.

4. The vehicle surroundings monitoring device according to claim 3,
    wherein the overhead view display image generation unit generates the imaged image of which the scale becomes smaller as the vehicle speed increases.

5. The vehicle surroundings monitoring device according to claim 2,
    wherein, when the vehicle speed is equal to or lower than the threshold value, the overhead view display image generation unit generates the imaged image that displays the icon representing the object outside an imaging range of the image data acquisition unit in the imaged image.

6. The vehicle surroundings monitoring device according to claim 5,
   wherein the overhead view display image generation unit generates the imaged image of which the scale becomes smaller as the vehicle speed increases.

\* \* \* \* \*